United States Patent
Choi et al.

(10) Patent No.: US 7,541,916 B2
(45) Date of Patent: Jun. 2, 2009

(54) POWER SUPPLY USING STATIC MAGNETIC FIELD OF TIRE PRESSURE MONITORING SYSTEM

(75) Inventors: Sang Hoon Choi, Icheon-shi (KR); Dong Pil Chun, Icheon-shi (KR); Dae Hyuk Kwon, Icheon-shi (KR); Sang Kook Kim, Icheon-shi (KR); Heu Kyong Na, Icheon-shi (KR); Won Jo Lee, Icheon-shi (KR)

(73) Assignee: Hyundai Autonet Co., Ltd., Icheon-shi, Kyungki-do (KR)

( * ) Notice: Subject to any disclaimer, the term of this patent is extended or adjusted under 35 U.S.C. 154(b) by 632 days.

(21) Appl. No.: 11/163,999

(22) Filed: Nov. 7, 2005

(65) Prior Publication Data
US 2006/0176163 A1    Aug. 10, 2006

(30) Foreign Application Priority Data
Jan. 24, 2005    (KR) .................... 10-2005-0006217

(51) Int. Cl.
*B60R 25/10* (2006.01)
(52) U.S. Cl. .................. 340/426.33; 340/445; 340/442; 340/447; 340/448; 73/146.2
(58) Field of Classification Search ............... 340/442, 340/426.33, 445, 447, 448; 73/146.2, 146.4
See application file for complete search history.

(56) References Cited

U.S. PATENT DOCUMENTS

| | | | | |
|---|---|---|---|---|
| 5,874,792 A * | 2/1999 | Chen et al. | ................ | 310/75 C |
| 6,492,809 B1 * | 12/2002 | Speier et al. | ................ | 324/303 |
| 7,132,939 B2 * | 11/2006 | Tyndall et al. | .............. | 340/447 |
| 7,180,409 B2 * | 2/2007 | Brey | .......................... | 340/442 |

FOREIGN PATENT DOCUMENTS

| | | |
|---|---|---|
| JP | 2004-012343 | 1/2004 |
| JP | 2004-242203 | 8/2004 |
| KR | 1019790000889 | 7/1979 |
| KR | 1019900008140 | 11/1990 |

\* cited by examiner

*Primary Examiner*—Daryl Pope
(74) *Attorney, Agent, or Firm*—IPLA P.A.; James E. Bame

(57) ABSTRACT

A power supply using a static magnetic field of a tire pressure monitoring system is provided. The power supply includes: a static magnetic field generator installed at a car position adjacent to a tire, and generating the static magnetic field; and an EMF (ElectroMotive Force) coil installed at the tire, and generating an induced electromotive force by the generated static magnetic field and a relative motion resulting from rotation of the tire, and providing the generated electromotive force to the transmitter and the sensor.

2 Claims, 1 Drawing Sheet

POWER SUPPLY USING STATIC MAGNETIC FIELD OF TIRE PRESSURE MONITORING SYSTEM

BACKGROUND OF THE INVENTION

1. Field of the Invention

The present invention relates to a power supply for a tire pressure monitoring system, and more particularly, to a power supply for generating an electric source using a static magnetic field of a tire pressure monitoring system.

2. Description of the Related Art

In general, a tire pressure monitoring system (TPMS) measures a tire pressure, and generates an alarm and informs a user when the measured pressure is lower than a previously set reference pressure. The TPMS uses a general small-sized dry cell as an electric source. However, the small-sized dry cell has a different temperature characteristic depending on material or internal substance of the dry cell, and is still in existence of a possibility of deteriorating its performance at a high temperature and a low temperature.

Due to such a drawback of the electric source, a battery-less tire pressure monitoring system (TPMS) is under development. The battery-less TPMS wireless transmits external energy. As such a technology, there are a low frequency (LF) transmission method using a LF electromagnetic wave being an alternating electronic field and a radio frequency (RF) method using an ultra high frequency (UHF) electromagnetic wave. Both methods are based on the alternating electronic field where the electronic field is temporally changed in polarity. In the LF method, energy is transmitted using a magnetic field coupling method, and in the RF method, the energy is transmitted using an electronic field coupling method.

The battery-less tire pressure monitoring system employing the general methods includes a receiver and a transmitter. The receiver is installed at a car and is connected with a constituent element transmitting the energy. The transmitter is installed at a tire, and receives the energy from the energy transmitting element, uses the received energy as a driving power, measures the tire pressure, and transmits the measured tire pressure data to the receiver.

Since the transmitter using the LF and RF methods needs a electromagnetic wave source, it should include the constituent element, that is, a LF or RF antenna for transmitting the energy to a peripheral position of the tire, that is, to a periphery of the tire such as an inner side of a car fender, and should wire connect the LF or RF antenna with the receiver.

As described above, in the conventional tire pressure monitoring system, in case where the general dry cell is used, the temperature characteristic is different depending on the material and the internal substance of the dry cell and therefore, there is a drawback in that performance can be deteriorated depending on a temperature.

Further, the tire pressure monitoring system using the LF or RF method should be wire connected with the energy transmitting element and therefore, there is a drawback in that its installation at the car is difficult and its installation cost is expensive, thereby laying a burden on a user or manufacturer in purchasing or manufacturing the battery-less (that is, dry cell-less) tire pressure monitoring system.

SUMMARY OF THE INVENTION

Accordingly, the present invention is directed to a power supply using a static magnetic field of a tire pressure monitoring system that substantially overcomes one or more of the limitations and disadvantages of the conventional art.

One object of the present invention is to provide a power supply using a static magnetic field of a tire pressure monitoring system, for generating an induced electromotive force by the static magnetic field and a relative motion resulting from rotation of a tire equipped with a Radio Frequency Identification (RFID) tag, and utilizing the generated induced electromotive force as an electric source of a transmitter for transmitting tire pressure measurement data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a RFID (Radio Frequency Identification) tag power supply using a static magnetic field of a RFID TPMS (tire pressure monitoring system), which has a sensor for periodically measuring a tire pressure and generating tire pressure data and a transmitter for storing the measured tire pressure data and loading and transmitting the tire pressure data on a radio frequency, the power supply including: a static magnetic field generator installed at a car position adjacent to a tire, and generating the static magnetic field; and an EMF (ElectroMotive Force) coil installed at the tire, and generating an induced electromotive force by the generated static magnetic field and a relative motion resulting from rotation of the tire, and providing the generated electromotive force to the transmitter and the sensor.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
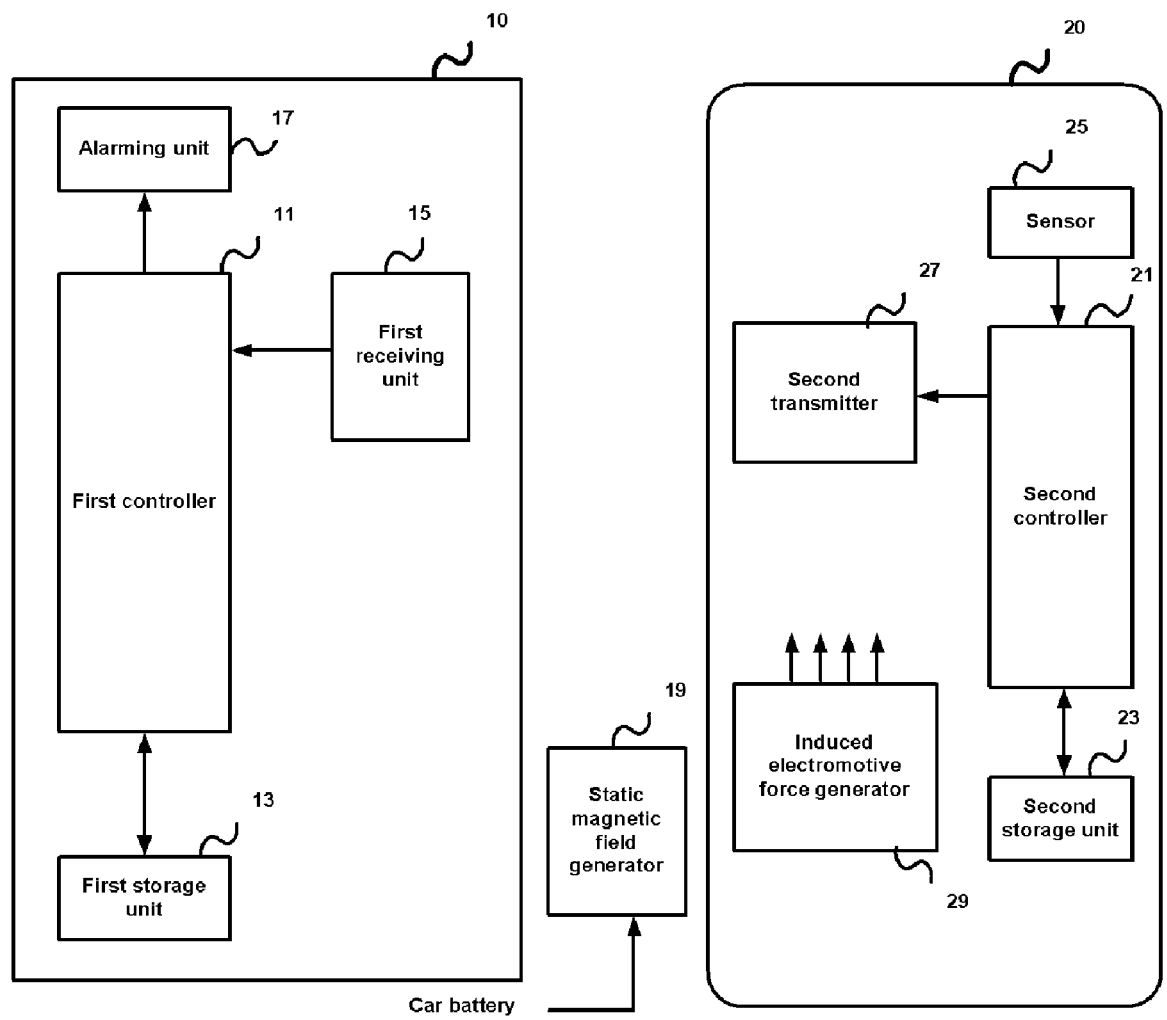
FIG. 1 illustrates a construction of a Radio Frequency Identification (RFID) tag power supply using a static magnetic field of a RFID tire pressure monitoring system according to the present invention.

Reference will now be made in detail to the preferred embodiments of the present invention, examples of which are illustrated in the accompanying drawings. Wherever possible, the same reference numerals will be used throughout the drawings to refer to the same or like parts.

The present invention provides a power supply including a static magnetic field generator and a static magnetic field coil. The static magnetic field generator transmits energy independently of a receiver of a tire pressure monitoring system (TPMS). The static magnetic field coil is installed at a tire, and generates an induced electromotive force by a static magnetic field generated from the static magnetic field generator and a relative motion resulting from rotation of a tire, and supplies an electric source to a transmitter.

Hereinafter, a description will be made with reference to FIG. 1. FIG. 1 illustrates a construction of the radio frequency identification (RFID) tag power supply using the static magnetic field of the RFID TPMS according to the present invention.

In the present invention, the battery-less tire pressure monitoring system includes the receiver 10, the transmitter 20, and the static magnetic field generator 19.

The receiver 10 includes a first controller 11, a first storage unit 13, a first receiving unit 15, and an alarming unit 17. The first controller 11 controls a general operation of the receiver 10 to alarm a tire pressure. The first storage unit 13 includes a region for storing a control program for alarming the tire pressure, a region for temporarily storing data generated when the control program is executed, and a region for storing tire pressure data inputted from the first receiving unit 15, and reference tire pressure data for alarming a check and replacement time for the tire. The first receiving unit 15 receives the tire pressure data loaded on a radio frequency (RF) from the transmitter 20, and detects (that is, modulates) the tire pressure data from the radio frequency. The first controller 11 receives the tire pressure data, compares the received tire pressure data with the previously stored reference tire pressure data, and generates an alarm signal when the received tire pressure data is determined to be smaller.

The alarming unit 17 receives the alarm signal from the first controller 11, and generates an alarm.

The static magnetic field generator 19 is disposed outside of the tire, and generates the static magnetic field. In detail, in order to operate separately from the transmitter 10, the static magnetic field generator 19 can also generate the static magnetic field using even a permanent magnet such as a rare earth magnet, and also can use an electromagnet receiving the electric source from a separate battery or a car battery and operating as shown in FIG. 1. However, in case where the electromagnet is used, a driving circuit (not shown) of the electromagnet can have a timer (not shown) to be driven at a different time every car tire. This is to facilitate automatic recognition for the tire through sequential arrangement of times at which the electric source is applied to each tire.

The transmitter 20 includes a second controller 21, a second storage unit 23, a sensor 25, a second transmitting unit 27, and an induced electromotive force generator 29.

The second controller 21 receives a predetermined electric source, and controls a general operation of the transmitter 20 to alarm the tire pressure. The second storage unit 23 includes a region for storing a control program for alarming the tire pressure, a region for temporarily storing data generated when the control program is executed, and a region for storing the tire pressure data measured by the sensor 25.

The sensor 25 receives a predetermined electric source, measures a tire pressure, generates and outputs tire pressure data to the second controller 21. Then, the second controller 21 stores the tire pressure data in the second storage unit 23, and transmits the tire pressure data loaded on the radio frequency, to the receiver 10 through the second transmitting unit 27.

The induced electromotive force generator 29 being the static magnetic coil generates the induced electromotive force by the relative motion resulting from rotation of the tire and the static magnetic field generated from the static magnetic field generator 19, and provides the generated electromotive force to each constituent element of the transmitter 20.

As described above, the present invention has an advantage in that unlike a conventional method using the radio frequency (RF) or a low frequency (LF), the battery-less tire pressure monitoring system can be embodied using the static magnetic field, thereby becoming relatively cheap and facilitating installation.

Further, the present invention has an advantage in that since it is possible to sequentially supply the electric source to the tire depending on a method for generating the static magnetic field, an operation of the automatic recognition for the tire can be performed independently of the receiver.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A RFID (Radio Frequency Identification) tag power supply using a static magnetic field of a RFID TPMS (tire pressure monitoring system), which has a sensor for periodically measuring a tire pressure and generating tire pressure data and a transmitter for storing the measured tire pressure data and loading and transmitting the tire pressure data on a radio frequency, the power supply comprising:

a static magnetic field generator installed at a portion of a car adjacent to a tire, and generating a static magnetic field, wherein the static magnetic field generator comprises an electromagnet powered by a car battery; and an EMF (ElectroMotive Force) coil installed at the tire, and generating an induced electromotive force by the generated static magnetic field and a relative motion resulting from rotation of the tire, and providing the generated electromotive force to the transmitter and the sensor.

2. A RFID (Radio Frequency Identification) tag power supply using a static magnetic field of a RFID TPMS (tire pressure monitoring system), which has a sensor for periodically measuring a tire pressure and generating tire pressure data and a transmitter for storing the measured tire pressure data and loading and transmitting the tire pressure data on a radio frequency, the power supply comprising:

a static magnetic field generator installed at a portion of a car adjacent to a tire, and generating a static magnetic field, wherein the static magnetic field generator comprises a permanent magnet; and an EMF (ElectroMotive Force) coil installed at the tire, and generating an induced electromotive force by the generated static magnetic field and a relative motion resulting from rotation of the tire, and providing the generated electromotive force to the transmitter and the sensor.

* * * * *